United States Patent
Nakata et al.

(10) Patent No.: US 11,227,357 B2
(45) Date of Patent: Jan. 18, 2022

(54) DATA PROCESSING APPARATUS, DATA PROCESSING METHOD, AND COMPUTER PROGRAM

(71) Applicant: Sony Interactive Entertainment Inc., Tokyo (JP)

(72) Inventors: Daisuke Nakata, Kanagawa (JP); Takahiro Nakayama, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 11 days.

(21) Appl. No.: 16/318,019

(22) PCT Filed: Aug. 15, 2017

(86) PCT No.: PCT/JP2017/029405
§ 371 (c)(1),
(2) Date: Jan. 15, 2019

(87) PCT Pub. No.: WO2018/037976
PCT Pub. Date: Mar. 1, 2018

(65) Prior Publication Data
US 2019/0304050 A1   Oct. 3, 2019

(30) Foreign Application Priority Data
Aug. 22, 2016   (JP) .............................. JP2016-162289

(51) Int. Cl.
*G06T 1/20* (2006.01)
*G06T 17/00* (2006.01)

(52) U.S. Cl.
CPC ................ *G06T 1/20* (2013.01); *G06T 17/00* (2013.01)

(58) Field of Classification Search
CPC .................................. G06T 17/00; G06T 1/20
See application file for complete search history.

(56) References Cited

U.S. PATENT DOCUMENTS 6,414,680 B1   7/2002   Kloaowski
7,804,498 B1   9/2010   Graham
(Continued)

FOREIGN PATENT DOCUMENTS

| JP | 2014216006 A | 11/2014 |
| JP | 2015197329 A | 11/2015 |
| JP | 2015210186 A | 11/2015 |

OTHER PUBLICATIONS

"Cluster Analysis and Priority Sorting in Huge Point Clouds for Building Reconstruction", Hansen et al., 2006, Proceedings of the 18th International Conference on Pattern Recognition (ICPR'06).*

(Continued)

*Primary Examiner* — Ryan R Yang
(74) *Attorney, Agent, or Firm* — Matthew B. Dernier, Esq.

(57) ABSTRACT

A master node acquires a point group, each point of which belongs to any one of a plurality of blocks into which a space has been divided, the point group representing an appearance of the space by a collection of a plurality of points. The master node determines a priority of each of the plurality of blocks on the basis of the number of points belonging to each of the plurality of blocks. The master node preferentially performs processing of higher priority blocks among the plurality of blocks than processing of lower priority blocks.

10 Claims, 10 Drawing Sheets

(56) References Cited

U.S. PATENT DOCUMENTS

| | | | |
|---|---|---|---|
| 9,069,415 B2 | 6/2015 | Kratz | |
| 2008/0256091 A1* | 10/2008 | Kampmann | H04N 19/132 |
| 2009/0303245 A1 | 12/2009 | Soupikov | |
| 2012/0218277 A1 | 8/2012 | Matilla | |
| 2013/0182104 A1* | 7/2013 | Mangold | H04N 7/181 348/143 |
| 2014/0172377 A1* | 6/2014 | Taubin | G06T 17/00 703/1 |
| 2014/0313136 A1 | 10/2014 | Kratz | |
| 2015/0313555 A1* | 11/2015 | Nabutovsky | A61B 5/044 600/374 |
| 2015/0371110 A1 | 12/2015 | Hwang | |
| 2016/0323159 A1* | 11/2016 | Leblanc | H04L 43/065 |
| 2017/0075330 A1* | 3/2017 | Matsunami | G01S 17/42 |
| 2017/0347120 A1* | 11/2017 | Chou | H04N 19/15 |
| 2018/0350044 A1* | 12/2018 | Ponto | G06T 5/007 |
| 2019/0259202 A1* | 8/2019 | Taubin | G06T 17/00 |

OTHER PUBLICATIONS

International Search Report for corresponding PCT Application ON. PCT/JP2017/029405, 3 pages, dated Oct. 10, 2017.

Taro Suzuki, Mitsunori Kitamura, Takumi A Hashizume, "Outdoor 3D Mapping and its Application for Mobile Robots", Journal of the Society of Instrument and Control Engineers, vol. 4 9, No. 9, pp. 640 to 644, dated Sep. 10, 2010. (for relevancy see International Search Report for corresponding PCT Application ON. PCT/JP2017/029405, 3 pages, dated Oct. 10, 2017 cited above).

International Preliminary Report on Patentability and Written Opinion for corresponding PCT Application PCT/JP2017/029405, 13 pages, dated Dec. 27, 2018.

The Extended European Search Report for corresponding EP Application 17843459.3, 19 pages, dated May 4, 2020.

Johanna Beyer, et al., "State-of-the-Art in GPU-Based Large-Scale Volume Visualization : GPU-Based Large-Scale Volume Visualization" Computer Graphics Forum, vol. 34, No. 8, pp. 13-37, Dec. 1, 2015.

Zoran Constantinescu, "Levels of Detail: An Overview" Nonlinear Analysis: Modeling and Control, Norwegian University of Science and Technology, vol. 5, pp. 1-6, May 1, 2001.

X. Desurmont, et al., "Real-time 3D video conference on generic hardware" SPIE International Society for Optical Engineering Proceedings vol. 6496, 12 pages, Feb. 7, 2007.

The Partial Supplementary European Search Report for corresponding EP Application 17843459.3, 15 pages, dated Feb. 4, 2020.

Cura Remi et al., "A scalable and multi-purpose point cloud server (PCS) for easier and faster point cloud data management and processing". ISPRS Journal of Photogrammetry and Remote Sensing. Amsterdam [U.A.]: Elsevier, vol. 127, pp. 39-56, Jul. 12, 2016.

Thomas Kanzok et al., "An Interactive Visualization System for Huge Architectural Laser Scans" pp. 1-9, Dept. Domp. Science, Technische University, DE URL:https://pdfs.semanticscholar.orgjd333/44d21983d08fbf4cd239ee9e061d2d8d6a87.pdf, Mar. 11, 2015.

* cited by examiner

FIG.1
(a)
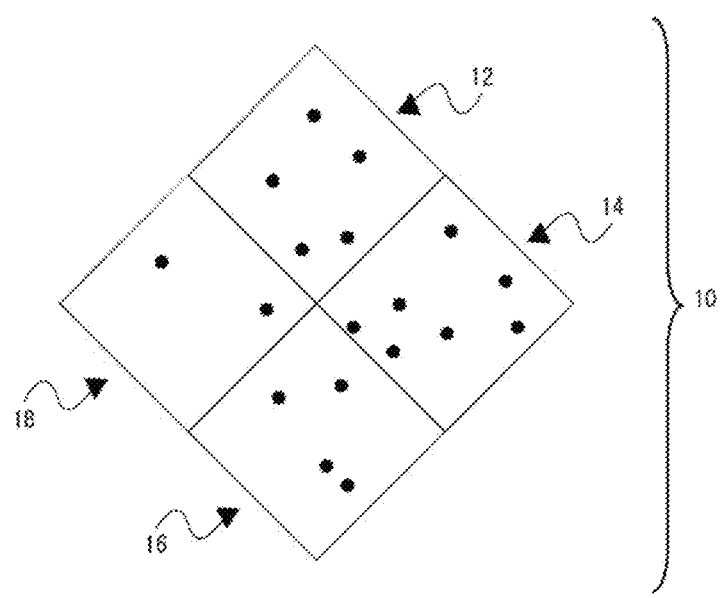
(b)
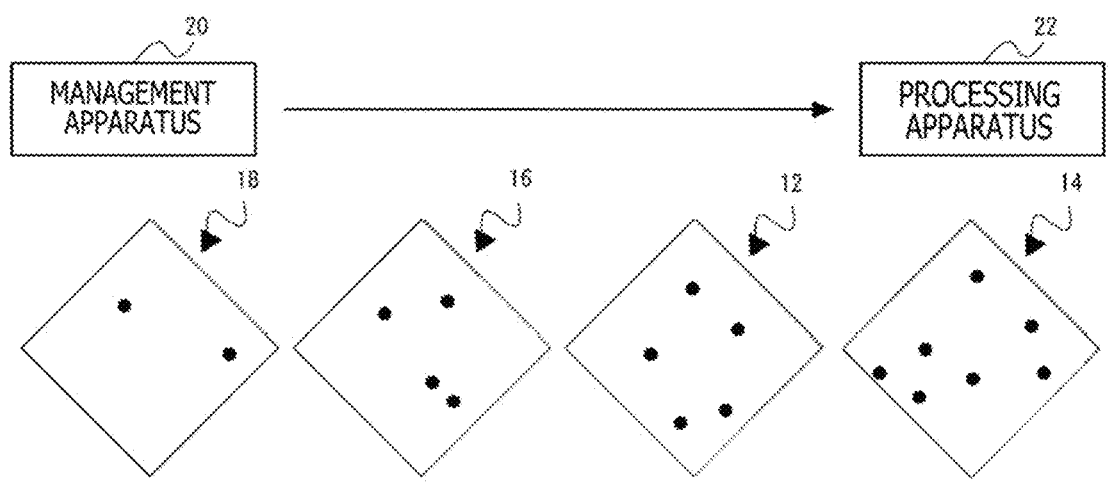

FIG.11
(a)
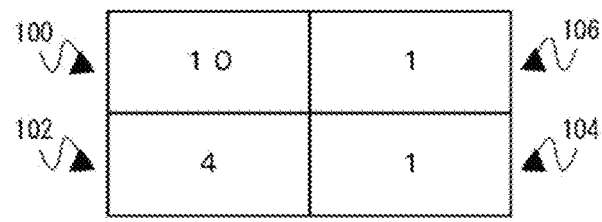
(b)
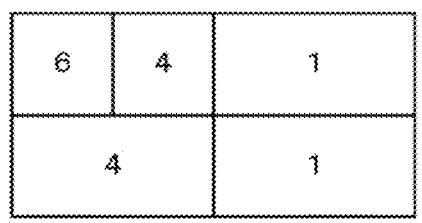
(c)
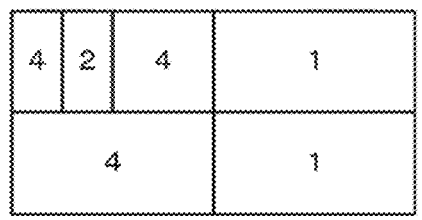
(d)
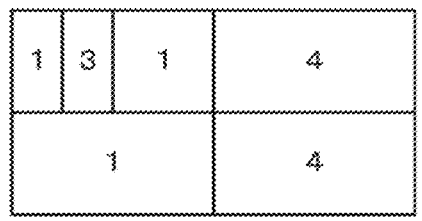
(e)
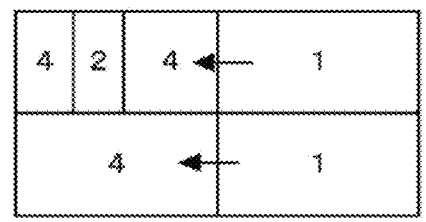
(f)
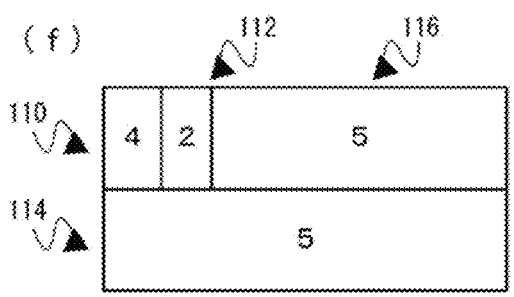

DATA PROCESSING APPARATUS, DATA PROCESSING METHOD, AND COMPUTER PROGRAM

TECHNICAL FIELD

The present invention relates to a data processing technique.

BACKGROUND ART

A real space is captured as a point group (also, referred to as a "point cloud") and an image indicating a situation of the real space has been generated by using the point group.

CITATION LIST

Patent Literature

[PTL 1] JP 2014-216006A

SUMMARY

Technical Problem

A quality of an image generated by the point group is dependent on the number of points in the point group and further a load of drawing processing, etc. increases in accordance with the number of the points. The present invention has been made in view of the above problem. A main object of the present invention is to provide techniques for improving an efficiency of data processing using the point group.

Solution to Problem

To solve the above problem, a data processing apparatus according to one mode of the present invention includes a point group acquisition section configured to acquire a point group, each point of which belongs to any one of a plurality of blocks into which a space has been divided, the point group representing an appearance of the space by a collection of a plurality of points, a priority determination section configured to determine a priority of each block on the basis of the number of points belonging to each of the plurality of blocks, and a point group processing section configured to process the plurality of blocks in accordance with the priority determined by the priority determination section.

Another mode of the present invention is directed to a data processing method. This method carried out by a computer, includes a step of acquiring a point group, each point of which belongs to any one of a plurality of blocks into which a space has been divided, the point group representing an appearance of the space by a collection of a plurality of points, a step of determining a priority of each block on the basis of the number of points belonging to each of the plurality of blocks, and a step of processing the plurality of blocks in accordance with the priority determined by the determination step.

It should be noted that those obtained by converting any combinations of the components described above and the expressions of the present invention between a system, a program, a storage medium storing the program, and the like are also valid as modes of the present invention.

Advantageous Effect of Invention

According to the present invention, an efficiency of data processing using the point group can be improved.

BRIEF DESCRIPTION OF DRAWINGS

FIG. 1 is a diagram illustrating a principle of a point group processing method according to an embodiment.
FIG. 11 is a diagram schematically illustrating a method for equalizing a load of a plurality of drawing nodes.

DESCRIPTION OF EMBODIMENTS

Figure 2:
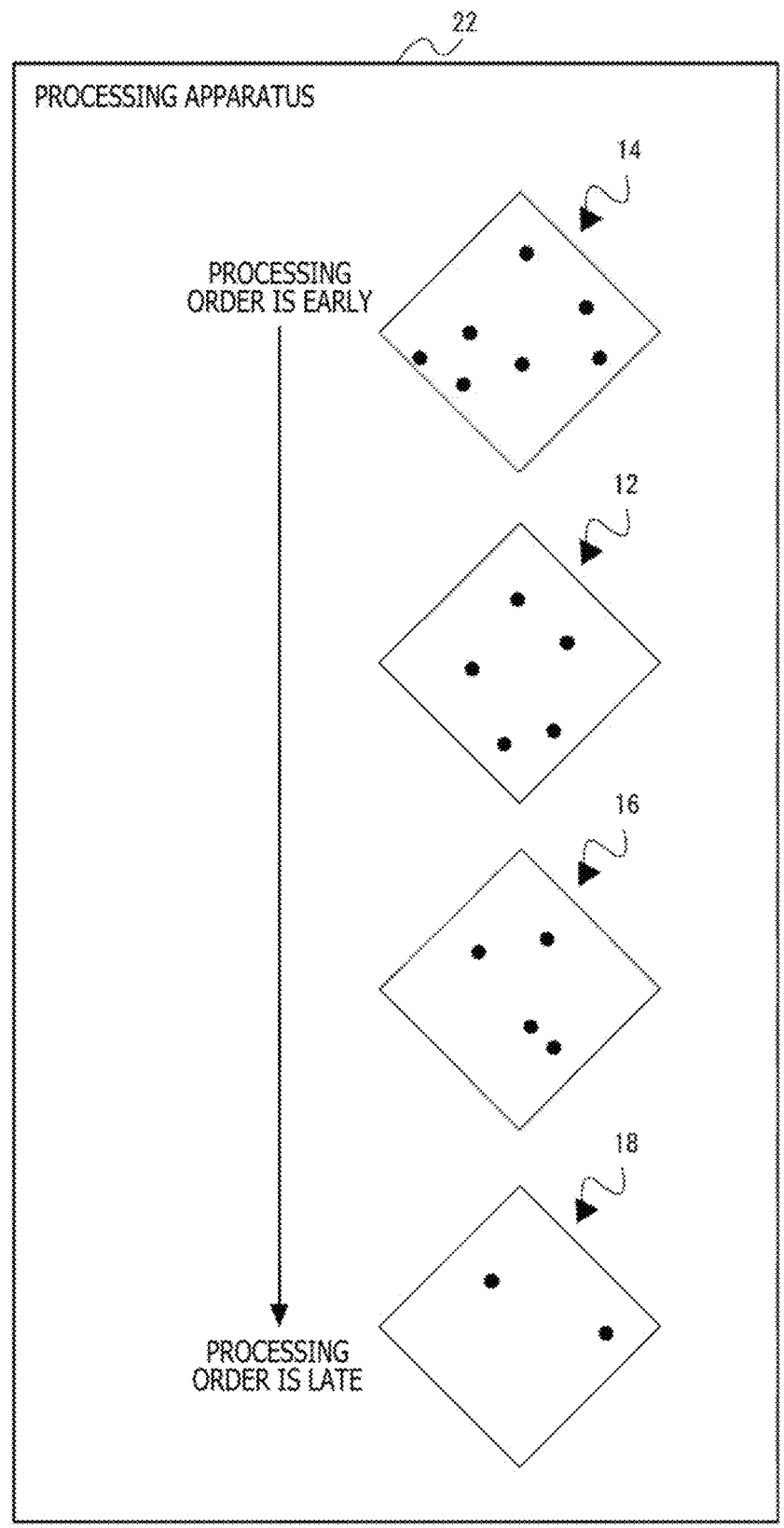
FIG. 2 is a diagram illustrating a principle of a point group processing method according to a variation.

Before an embodiment will be described in detail, an outline of the embodiment will be described. A real space is photographed by using a plurality of cameras and photographed images output by the plurality of cameras are synthesized or the like. Through this process, a point group in which an appearance (situation) of the real space is represented by a collection of points is generated. Further, an image indicating the real space is generated by using the point group. As the number of points more increases in the point group, image quality generated by the point group is more improved, and by contrast, a load of drawing processing and the like also increases.

In recent years, a point group including data of points more than 100 million pieces may be generated. In the point group corresponding to one frame, for example, as data of each point, 12 bytes (each coordinate value of X, Y, and Z is 4 bytes) are included as data representing a space coordinate and 4 bytes (each red, green, blue, alpha (RGBA) is 1 byte) are included as data representing color, and in total, data of 16 bytes may be included. Here, 16 bytes×100 million points reach appropriately 1.6 gigabytes. As described above, when data of a large amount of points is included in the point group, a communication time or processing time of the point group is extremely extended and a delay may be caused in the drawing processing.

To solve the above problem, in the embodiment, a data processing method is proposed such that prioritization to each point within the point group is performed and information regarding a more important point is preferentially processed. This process permits effective processing of a large amount of points within the point group to be implemented.

FIGS. 1(a) and 1(b) illustrate a principle of a point group processing method in the embodiment. As illustrated in FIG. 1(a), a point group 10 of the embodiment is divided into a plurality of areas (hereinafter, referred to as a "block"). The real point group 10 indicates an appearance of a three-dimensional space photographed by the plurality of cameras. Further, each individual block into which the three-dimensional space indicated by the point group 10 is divided also becomes a three-dimensional space. However, the above is simplified in the figure and a two-dimensional block is indicated. A block 12 includes five points, a block 14 includes seven points, a block 16 includes four points, and a block 18 includes two points.

Locality (eccentricity) of the point is included in the point group, and by dividing the space, a block (e.g., the block 18) with a relatively small number of points is caused. The present inventors have investigated that the block with a relatively small number of points has a low importance level in the entire space. Further, the present inventors have investigated that when a considerable number of points are present in the space, even if information regarding a small amount of points is not reflected on an image, an influence on the entire image is small and the user is made not to develop an uncomfortable feeling. Accordingly, in the image processing system according to the embodiment, a priority of communication or processing regarding the block with a small number of included points is made low. Specifically, order of communication or processing is postponed.

A management apparatus 20 illustrated in FIG. 1 carves out a plurality of blocks from the space indicated by the point group 10. Further, a processing apparatus 22 performs predetermined data processing (e.g., drawing processing) on the basis of the plurality of blocks carved out by the management apparatus 20. As illustrated in FIG. 1(b), the management apparatus 20 sequentially transmits the plurality of blocks to the processing apparatus 22. Further, the management apparatus 20 transmits a block with a larger number of points in early timing. When the block illustrated in FIG. 1(a) is carved out, the management apparatus 20 provides the block 14, the block 12, the block 16, and the block 18 for the processing apparatus 22 in the order corresponding to the above.

FIG. 2 illustrates a principle of a point group processing method according to the variation. When the predetermined data processing is performed on the basis of the plurality of blocks, the processing apparatus 22 performs the data processing on the block with a larger number of points in early timing. For example, the processing apparatus 22 performs the data processing on the four blocks illustrated in FIG. 1(a) on the basis of each block in the order corresponding to the block 14, the block 12, the block 16, and the block 18. The data processing based on the block includes drawing processing for generating an image indicating an appearance of the block on the basis of data of points within the block. In addition, the data processing includes various arithmetic processing such as a collision determination on the basis of data of the points included in the block.

In accordance with the point group processing method illustrated in FIGS. 1 and 2, the processing apparatus 22 is allowed to early perform processing on the block with a relatively high importance level. Further, generation of the delay is easily avoided in the processing of the block with a relatively high importance level. In addition, processing of the point group is performed in units of blocks and by priorities, and thereby effective processing of the point group with a large amount of points can be implemented.

Note that, in the point group processing method illustrated in FIGS. 1 and 2, a higher priority is assumed to be given to the block with a larger number of included points. As the variation, a higher priority may be given to the block with a higher density (e.g., the number of points/a volume of the block) of points. In addition, a higher priority may be given to the block in which a rate (e.g., the number of points within the block/the total number of points within the point group) is larger in the number of points within the block occupied in the total number of points within the point group (within a photographing space).

Figure 3:
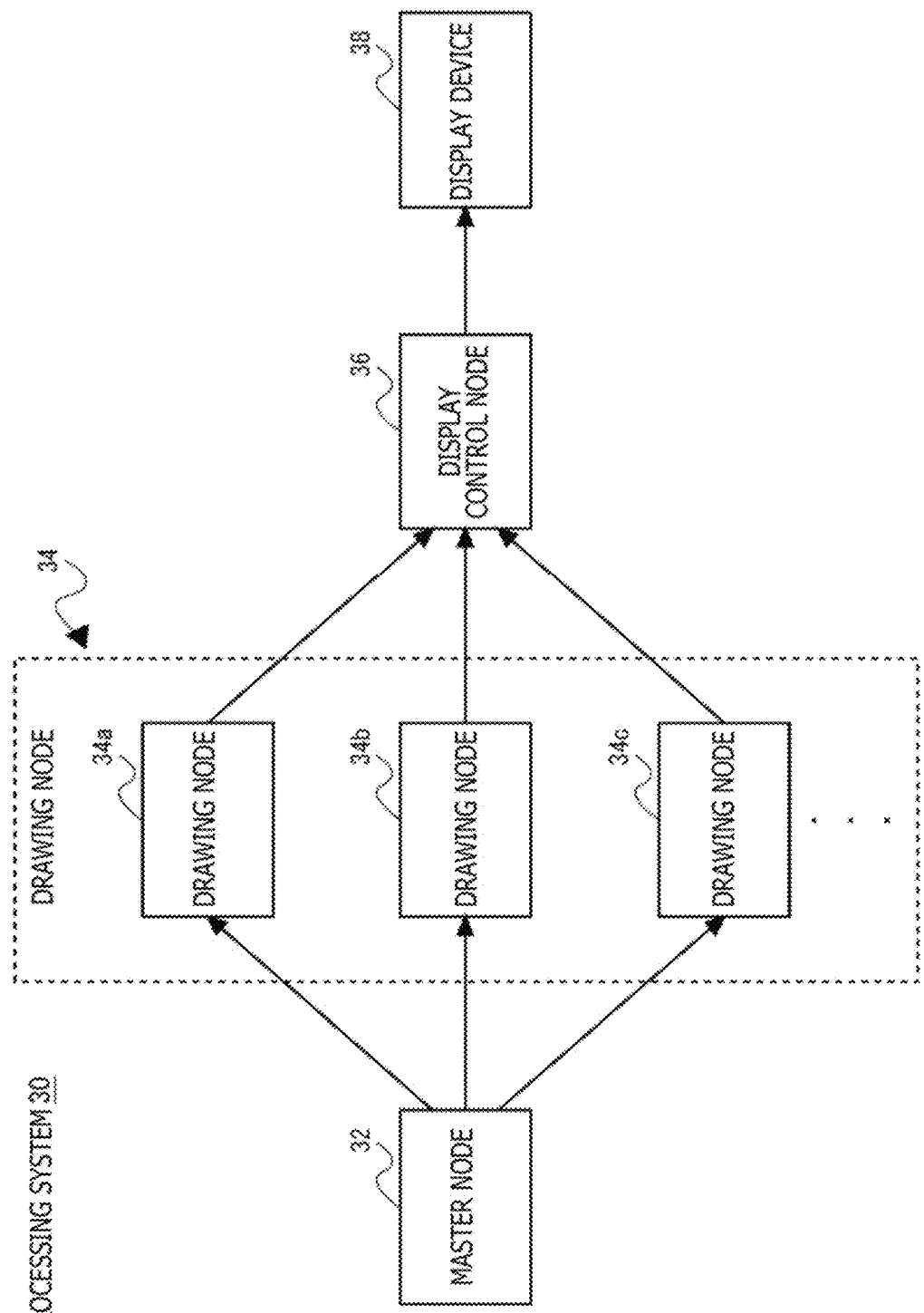
FIG. 3 is a diagram illustrating a configuration of an image processing system according to the embodiment.

Hereinafter, a configuration according to the embodiment will be described in detail. FIG. 3 illustrates a configuration of the image processing system according to the embodiment. An image processing system 30 includes a master node 32, a drawing node 34a, drawing node 34b, and drawing node 34c named generically as a drawing node 34, a display control node 36, and a display device 38. Each of the apparatuses is connected through a communication network including a local area network (LAN), a wide area network (WAN), the Internet, and the like. The master node 32 and the drawing node 34 may constitute a cloud system that generates an image on the basis of the point group input from a first external apparatus (not illustrated) and provides the generated image data for a second external apparatus (apparatus, etc. corresponding to the display control node 36).

The master node 32 is a data processing apparatus corresponding to the management apparatus 20 illustrated in FIG. 1(b). The master node 32 divides the space indicated by the point group 10 into the plurality of blocks. Further, the master node 32 transmits data of each point included in the point group 10 in units of blocks to the respective drawing node 34a, drawing node 34b, and drawing node 34c.

The respective drawing node 34a, drawing node 34b, and drawing node 34c are data processing apparatuses corresponding to the processing apparatus 22 illustrated in FIG. 1(b) and FIG. 2. By using a known method, the drawing node 34 generates data of a bit map image on the basis of the data of each point within the point group. Note that the drawing node 34 is not limited to the number of drawing nodes in the image processing system 30. For example, the number of the drawing nodes may be one drawing node or four or more drawing nodes.

The drawing node 34a, the drawing node 34b, and the drawing node 34c generate an image (hereinafter, also referred to as an "individual image") indicating an appearance of the block on the basis of point data (data of the point included in each block) in units of blocks received from the master node 32. A plurality of individual images based on the plurality of blocks carved out from the same space are images to be simultaneously displayed on the display device 38. In other words, the plurality of individual images are images constituting different portions in the image (e.g., the image of one frame) to be displayed on the display device 38 at some point in time.

The display control node 36 synthesizes the individual images drawn by the respective drawing node 34a, drawing node 34b, and drawing node 34c. Through the process, the display control node 36 generates an image (hereinafter, also referred to as a "frame image") to be displayed on the display device 38. The display control node 36 allows the display device 38 to display the generated frame image. The display control node 36 may be a stationary data processing apparatus (e.g., a personal computer (PC) or a game machine). Further, the display device 38 may be a head-mounted display (HMD). Further, the display control node 36 and the display device 38 may be integrated into the same chassis as a portable game machine, etc.

Figure 4:
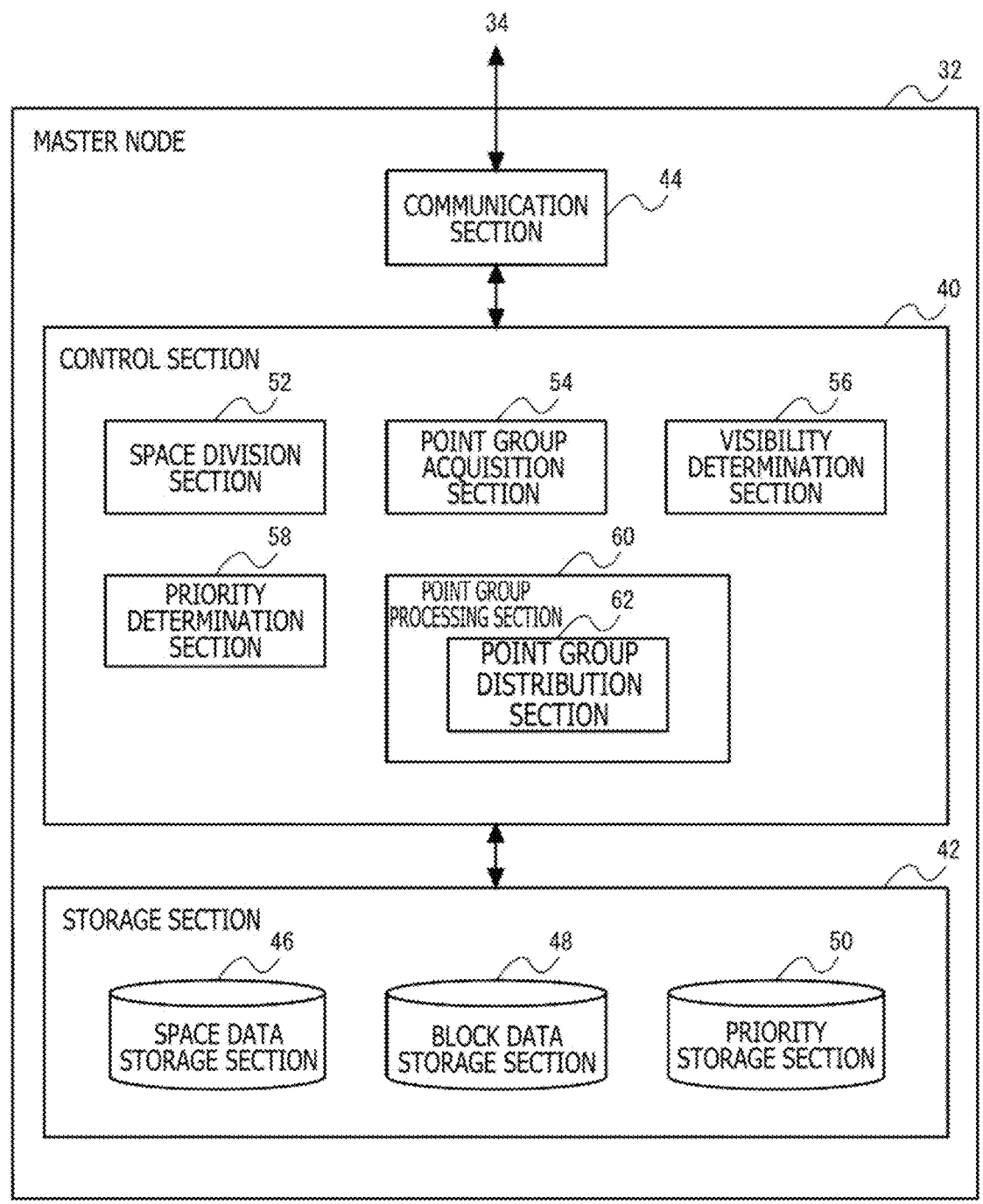
FIG. 4 is a block diagram illustrating a functional configuration of a master node illustrated in FIG. 3.

FIG. 4 is a block diagram illustrating a functional configuration of the master node 32 illustrated in FIG. 3. The master node 32 includes a control section 40, a storage section 42, and a communication section 44. The control section 40 performs the data processing for managing an image generation using the point group. The storage section 42 is a storage area that stores data to be referred to or updated by the control section 40. The communication section 44 communicates with external apparatuses in accordance with a predetermined communication protocol. The control section 40 transmits and receives data to and from each of the plurality of drawing nodes 34 via the communication section 44.

Each block indicated in the block diagram of the present specification can be implemented by devices or mechanical apparatuses including a central processing unit (CPU) and a memory of a computer in terms of hardware and further can be implemented by a computer program, etc. in terms of software. Here, a functional block to be implemented through a cooperation thereof is depicted. Therefore, it will be understood by those skilled in the art that the functional blocks may be achieved by a variety of manners including hardware only, software only or a combination of both.

For example, a function of each block of the control section 40 is implemented as a computer program (point group management program). Further, the point group management program may be installed in a storage of the master node 32. Then, a CPU of the master node 32 reads out the point group management program to a main memory and executes the point group management program. Through the process, a function of each block within the control section 40 may be exerted. Further, the storage section 42 may be implemented by using the main memory or storage of the master node 32.

The storage section 42 includes a space data storage section 46, a block data storage section 48, and a priority storage section 50. The space data storage section 46 is a space photographed by the plurality of cameras. In other words, the space data storage section 46 retains data of a space (hereinafter, also referred to as a "photographing space") that can be a drawing target by using the drawing node 34. Data of the photographing space according to the embodiment includes data of the point group obtained by representing an appearance (also, referred to as a situation or a content) of the photographing space by a collection of a plurality of points and further includes data of each point constituting the point group.

Data of each point constituting the point group includes three-dimensional coordinate data indicating a position within the photographing space and data indicating color. The three-dimensional coordinate data may be, for example, a combination of a coordinate value of a transverse direction (X axial direction), a coordinate value of a longitudinal direction (Y axial direction), and a coordinate value of a depth direction (Z axial direction) that indicates an absolute position within the photographing space. Further, data indicating the color may be, for example, a value of an RGBA color model.

The data of each point that constitutes the point group may further include data (direction, etc.) regarding a normal line and data (texture data, etc.) regarding a surface material. By including the data regarding the normal line, a calculation of an incidence angle or reflection angle of light can be supported in rendering processing of the drawing node 34. In addition to the above, the drawing node 34 can distinguish a front side and a rear side and skip the drawing processing on the rear side. Further, by including data regarding the surface material, a calculation of reflectance or absorptivity, etc. of light can be supported in the rendering processing of the drawing node 34.

The block data storage section 48 retains data of the plurality of blocks that mutually constitute a portion of the photographing space, which is the plurality of blocks (individual area) as a result of having divided the photographing space. The data of each block contains identification information of the block, boundary information (e.g., coordinate values of vertexes of the block), and data (the above-mentioned coordinate data, color data, and the like) of one or more points belonging to the block. The priority storage section 50 retains data indicating a priority given to each of the plurality of blocks.

The control section 40 includes a space division section 52, a point group acquisition section 54, a visibility determination section 56, a priority determination section 58, and a point group processing section 60. The space division section 52 reads out the point group data of the photographing space retained by the space data storage section 46. Further, the space division section 52 divides the photographing space in accordance with a predetermined division algorithm. The space division section 52 stores data of the point belonging to each block in the block data storage section 48, which is data of the plurality of blocks, as data indicating a result of the division. The space division section 52 may use a known algorithm such as an octree and a k-d tree, as the division algorithm.

The point group acquisition section 54 acquires data of the point group set so that each point belongs to any one of the plurality of blocks into which the photographing space is divided. In the embodiment, the point group acquisition section 54 reads data of the point belonging to each of the plurality of blocks, which is data of the plurality of blocks, from the block data storage section 48.

The visibility determination section 56 determines which block is viewed by the user among the plurality of blocks within the photographing space in accordance with a point-of-view position, line-of-sight direction, attitude, field angle of the user, or the like. Here, the user may be the user who wears the display device 38 (e.g., an HMD). Alternatively, the user may be a virtual camera that is virtually arranged in the point-of-view position of the user. In other words, the visibility determination section 56 specifies a block (hereinafter, referred to as a "drawing target block") to be a drawing processing target among the plurality of blocks within the photographing space. Typically, the visibility determination section 56 specifies a plurality of drawing target blocks.

The priority determination section 58 determines the priority of each drawing target block on the basis of the number of points belonging to each of the plurality of drawing target blocks specified by the visibility determination section 56. The priority determination section 58 according to the embodiment counts the number of points belonging to each of the plurality of drawing target blocks. Further, the priority determination section 58 gives a higher priority to the drawing target block with a larger number of included points. For example, the priority determination section 58 gives a higher priority to four blocks illustrated in FIG. 1(a) in the order corresponding to the block 14, the block 12, the block 16, and the block 18.

The point group processing section 60 processes the plurality of drawing target blocks in the order corresponding to the priority determined by the priority determination section 58. Further, the point group processing section 60 preferentially performs processing of higher priority blocks than processing of lower priority blocks among the plurality of blocks. The point group processing section 60 according to the embodiment preferentially performs data processing based on the point of relatively higher priority drawing target blocks than data processing based on the point of the relatively lower priority drawing target blocks among the plurality of drawing target blocks. In four blocks illustrated in FIG. 1(*a*), for example, the point group processing section 60 processes the point data of the block 14 with a highest priority, and subsequently processes the point data in the order according to the block 12, the block 16, and the block 18.

When processing of a portion of drawing target blocks has not been completed among the plurality of drawing target blocks until predetermined timing, the point group processing section 60 skips the processing of the portion of drawing target blocks. In other words, while the processing of the portion of drawing target blocks has not been completed, the point group processing section 60 ends the processing of the drawing target blocks.

The point group processing section 60 according to the embodiment includes a point group distribution section 62. The point group distribution section 62 transmits point data of a first drawing target block to the drawing node 34*a* among the plurality of drawing target blocks. Further, the point group distribution section 62 transmits point data of a second drawing target block different from the first drawing target block to the drawing node 34*b*. Further, the point group distribution section 62 transmits point data of a third drawing target block different from the first and second drawing target blocks to the drawing node 34*c*. Note, however, that the point group distribution section 62 sequentially transmits the plurality of drawing target blocks. On this occasion, the point group distribution section 62 transmits the higher priority blocks in early timing.

The point group distribution section 62 retains a correspondence relationship between the plurality of areas (individual area constitutes a portion of screen) in a screen on which an image based on the point group is displayed and the plurality of drawing nodes 34 (e.g., the drawing node 34*a*, the drawing node 34*b*, and the drawing node 34*c*). The point group distribution section 62 transmits point data of the drawing target block displayed in a screen area with which each node is associated to each of the plurality of drawing nodes 34. In other words, the point group distribution section 62 transmits point data of the drawing target block in which at least a portion thereof is included in the screen area with which each node is associated to each of the plurality of drawing nodes 34.

For example, it is assumed that a transmission destination of the block 12 (the number of points is five) illustrated in FIG. 1 is the drawing node 34*a*, a transmission destination of the block 14 (the number of points is seven) illustrated in FIG. 1 is the drawing node 34*b*, and a transmission destination of the block 16 (the number of points is four) illustrated in FIG. 1 is the drawing node 34*c*. In this case, the point group distribution section 62 first transmits the point data of the block 14 to the drawing node 34*b*, then transmits the point data of the block 12 to the drawing node 34*a*, and then transmits the point data of the block 16 to the drawing node 34*c*.

When a portion of drawing target blocks has not been transmitted among the plurality of drawing target blocks to the drawing node 34 until the predetermined distribution timing (or the drawing timing), the point group distribution section 62 skips transmission of the portion of drawing target blocks. In other words, while the portion of drawing target blocks have not been transmitted to the drawing node 34, the point group distribution section 62 ends the processing of the drawing target blocks. In this result, an image based on a lower priority drawing target block is not generated depending on a communication state between the master node 32 and the drawing node 34.

Figure 5:
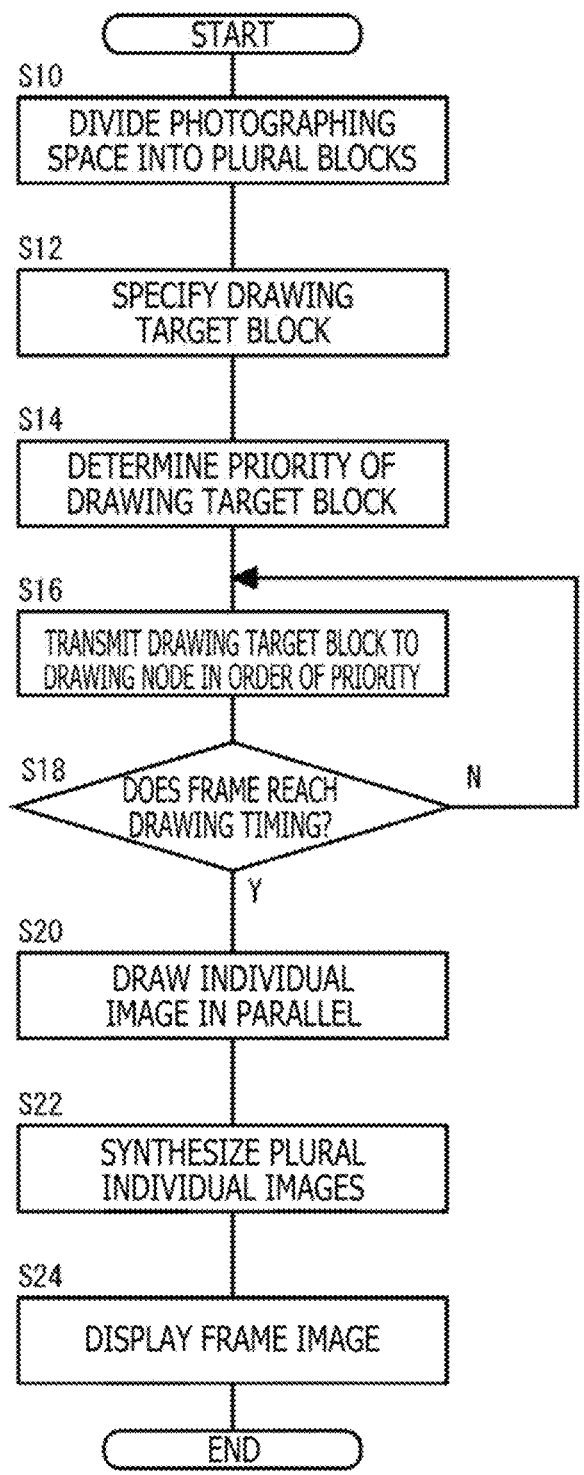
FIG. 5 is a flowchart illustrating operations of the image processing system according to the embodiment.

Operations of the image processing system 30 having the above configuration will be described. FIG. 5 is a flowchart illustrating the operations of the image processing system 30 according to the embodiment. In the embodiment, the plurality of cameras (not illustrated) and a point group generation apparatus (not illustrated) are assumed to be provided outside the image processing system 30. Further, they may be provided inside the image processing system 30. The plurality of cameras capture the same space in parallel in different directions and angles. The point group generation apparatus generates data of the point groups by using a known method on the basis of a plurality of images output from the plurality of cameras. Here, a piece of data of the point group is assumed to correspond to one frame displayed on the display device 38.

The space data storage section 46 of the master node 32 retains data of the point group generated by the point group generation apparatus as the data indicating the photographing space. That is, the space data storage section 46 retains data of a plurality of point groups corresponding to a plurality of frames displayed on the display device 38. Note that the point group generation apparatus may generate data of the point group indicating a current appearance of the photographing space in real time on the basis of the plurality of images output from the plurality of cameras. Further, the point group generation apparatus may instantly store data of the generated point group in the space data storage section 46 of the master node 32.

Figure 6:
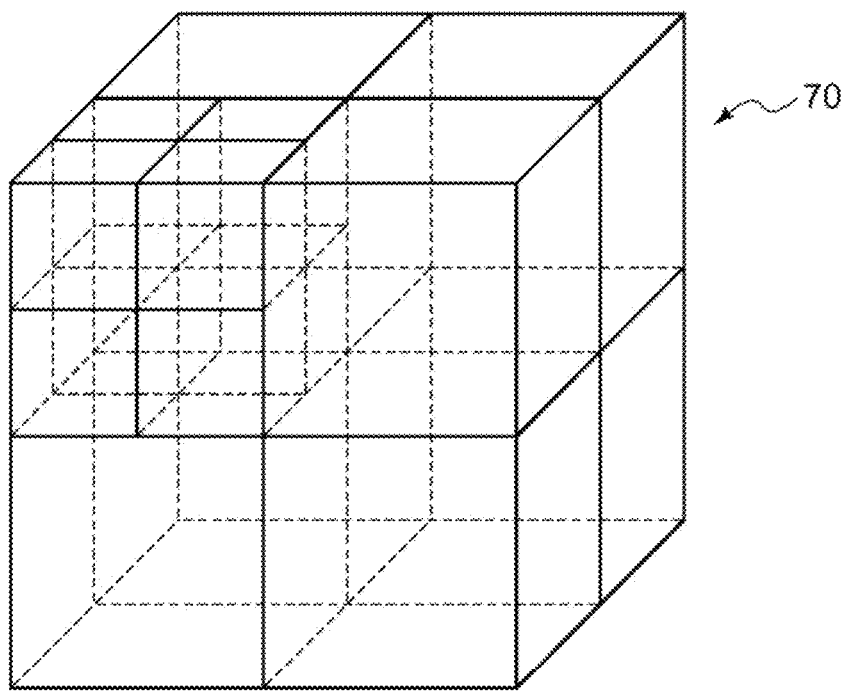
FIG. 6 is a diagram schematically illustrating a division of a photographing space.
Figure 7:
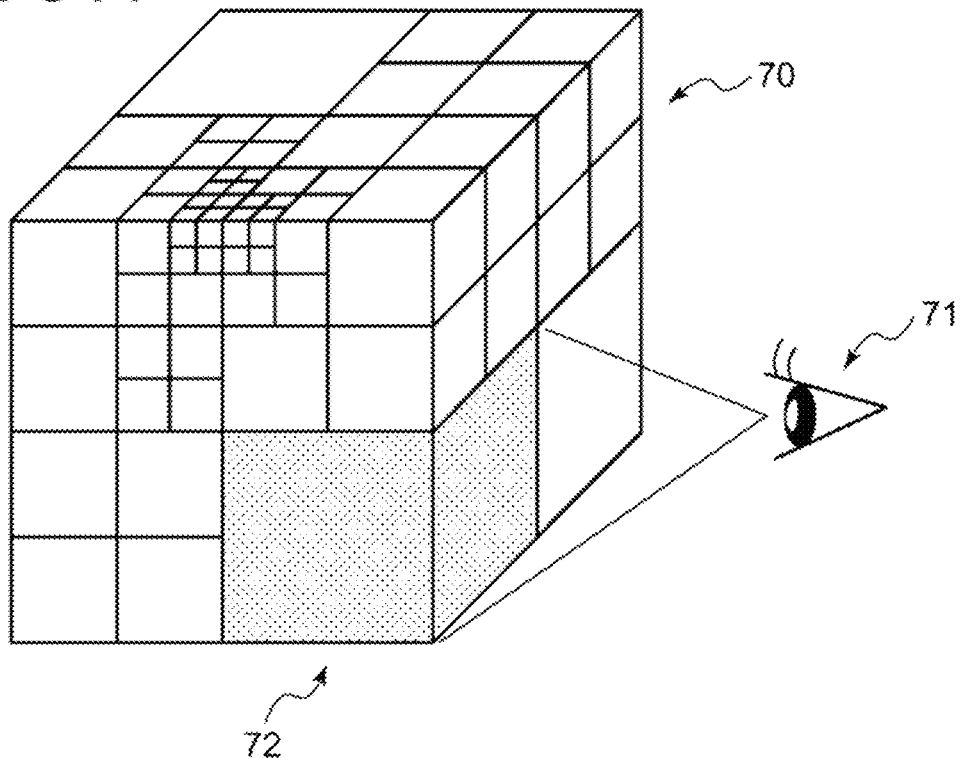
FIG. 7 is a diagram schematically illustrating a visibility determination to the photographing space.

FIG. 6 schematically illustrates a division of the photographing space. The space division section 52 of the master node 32 reads out the point group data indicating the photographing space 70 stored in the space data storage section 46. Further, the space division section 52 divides the photographing space 70 into the plurality of blocks in accordance with the predetermined division algorithm (S10). The space division section 52 stores the point data of each block in the block data storage section 48. The point group acquisition section 54 of the master node 32 reads out the point data of each block stored in the block data storage section 48. FIG. 7 schematically illustrates the visibility determination to the photographing space. The visibility determination section 56 of the master node 32 determines which block is viewed by a user 71 among the plurality of blocks within the photographing space 70, in accordance with a point-of-view position, attitude, or line-of-sight direction of the user 71 (or the virtual camera). The visibility determination section 56 specifies the plurality of blocks viewed by the user 71 as a drawing target block 72 (S12).

Figure 8:
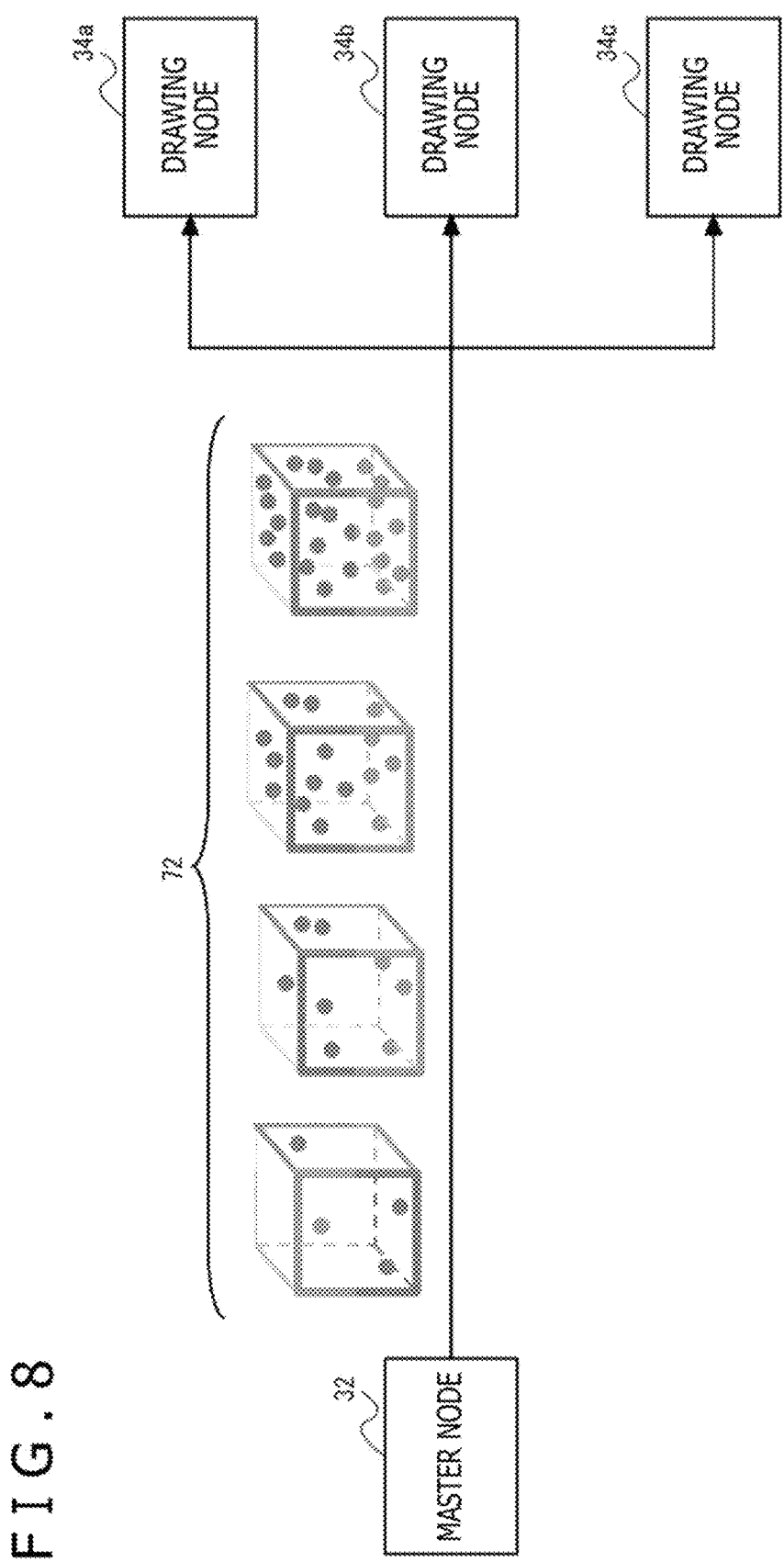
FIG. 8 is a diagram illustrating a transmission mode of data from the master node to a drawing node.

The priority determination section 58 of the master node 32 gives a higher priority to each of the plurality of drawing target blocks as the number of the included points is relatively larger (S14). FIG. 8 illustrates a transmission mode of data from the master node 32 to the drawing nodes 34. The point group distribution section 62 of the master node 32 sequentially transmits each of the plurality of drawing target blocks 72 to the corresponding drawing node 34. On this occasion, the point group distribution section 62 early transmits the drawing target block 72 with a larger number of included points to the corresponding drawing node 34 (S16).

If a predetermined frame does not reach the drawing timing (N in S18), the process returns to S16. Further, the point group distribution section 62 continues transmitting a lower priority drawing target block 72. If the predetermined frame reaches the drawing timing (Y in S18), the point group distribution section 62 subsequently stops transmitting the drawing target block 72.

The processing of the master node 32 illustrated in S10 to S18 of FIG. 5 is processing according to drawing of one frame. The master node 32 repeats the processing from S10 to S18 to the plurality of pieces of point group data corresponding to the plurality of frames. When Y in S18 is established, the master node 32 ends processing of the conventional frame, and then the process moves to processing of the next frame.

The plurality of drawing nodes 34 generates bit map images (hereinafter, also referred to as an "individual image") indicating an appearance of a portion of photographing space in parallel on the basis of the drawing target block 72 received from the master node 32 (S20). For example, a screen for displaying the frame image is divided into four areas of a left upper area, a left lower area, a right lower area, and a right upper area. In this case, the drawing node 34a may receive point data of the block relevant to the left upper area of the screen and generate data of the individual image to be displayed in the left upper area of the screen. Further, the drawing node 34b may receive point data of the block relevant to the left lower area of the screen and generate data of the individual image to be displayed in the left lower area of the screen. Further, the drawing node 34c may receive point data of the block relevant to the right lower area of the screen and generate data of the individual image to be displayed in the right lower area of the screen. Each of the plurality of drawing nodes 34 transmits the generated data of the individual image to the display control node 36.

Figure 9:
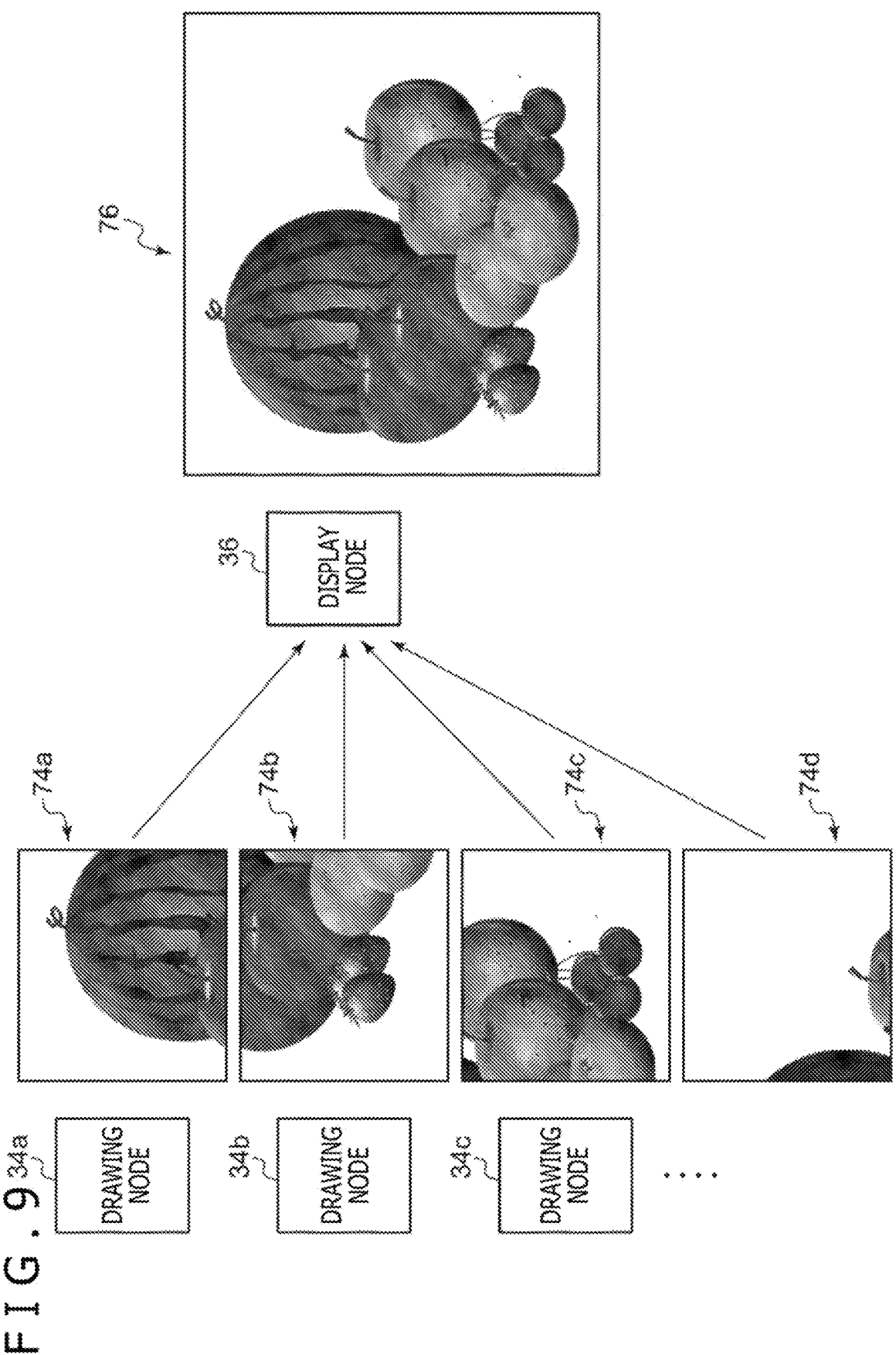
FIG. 9 is a diagram schematically illustrating generation of a frame image.

The display control node 36 synthesizes the individual images distributed and generated by the plurality of drawing nodes 34 in accordance with a correspondence relationship between the plurality of drawing nodes 34 and the plurality of areas within the screen and thereby generates an image (hereinafter, also referred to as a "frame image") of the entire frame (S22). FIG. 9 schematically illustrates generation of the frame image. The display control node 36 may generate the frame image 76 in which the individual image 74a generated by the drawing node 34a is arranged in the left upper area, the individual image 74b generated by the drawing node 34b is arranged in the left lower area, the individual image 74c generated by the drawing node 34c is arranged in the right lower area, and the individual image 74d generated by another drawing node (not illustrated) is arranged in the right upper area. The display control node 36 outputs data of the frame image to the display device 38. Further, the display control node 36 allows the display device 38 to display the frame image (S24).

As described already, there has arisen a problem that the point group to be a drawing processing target may include points in units of 100 million and it is difficult to perform drawing in real time by one device such as an ordinary PC. In the image processing system 30 according to the embodiment, the drawing processing is performed in a distributed manner by using the plurality of drawing nodes (graphics processing unit (GPU)) to thereby implement the image drawing based on a large amount of point data. Further, according to the image processing system 30 of the embodiment, in a block in which the number of points is small among the plurality of blocks into which the photographing space indicated by the point group is divided, the priority of communication or processing thereof is made low. For example, the order of the communication or processing is postponed. Even when the point group includes a large amount of point data, this process permits a communication load to be reduced and a processing load (load of the drawing processing or the like) to be suppressed.

Further, according to the image processing system 30 of the embodiment, it is considered that the importance level over the entire point group is high, communication or processing of the block with a larger number of points can be preferentially performed and a delay of communication or processing of the block with a higher importance level can be suppressed. In the image processing system 30 of the embodiment, a block in which an attention of the user is easy to collect is preferentially drawn. By contrast, a block that cannot be easily noticed by the user is drawn with best effort to thereby implement efficiency.

In the above, the present invention is described on the basis of the embodiment. It will be understood by those skilled in the art that the embodiment is illustrative, various variations are possible in combinations of each component and each processing process, and even such variations fall into the range of the present invention. Hereinafter, the variations will be described.

A first variation will be described. In the image processing system 30 according to the embodiment, the master node 32 illustrated in FIG. 3 determines the priority of the plurality of blocks constituting the photographing space. Further, the master node 32 preferentially transmits data of the higher priority blocks to the drawing node 34. As the variation, as illustrated in FIG. 2, the drawing node 34 (at least one of the drawing node 34a, the drawing node 34b, and the drawing node 34c) illustrated in FIG. 3 may determine the priority to the plurality of blocks constituting the photographing space. Further, the drawing node 34 may preferentially generate an image based on the data of the higher priority blocks. That is, the data processing according to the priority of the plurality of blocks may be performed by the drawing node 34 in place of the master node 32. Alternatively, the data processing may be performed by the drawing node 34 along with the master node 32.

The master node 32 according to the variation may divide the photographing space represented by the point group into the plurality of blocks. Further, the master node 32 may detect a block viewed by the user from among the plurality of blocks as the drawing target block. Then, the master node 32 may transmit the point data of the plurality of drawing target blocks to one drawing node 34 without giving the priority. Further, the master node 32 may transmit sequentially or in parallel the point data of the drawing target block relevant to an area in which each node handles the drawing to the plurality of drawing nodes 34.

Figure 10:
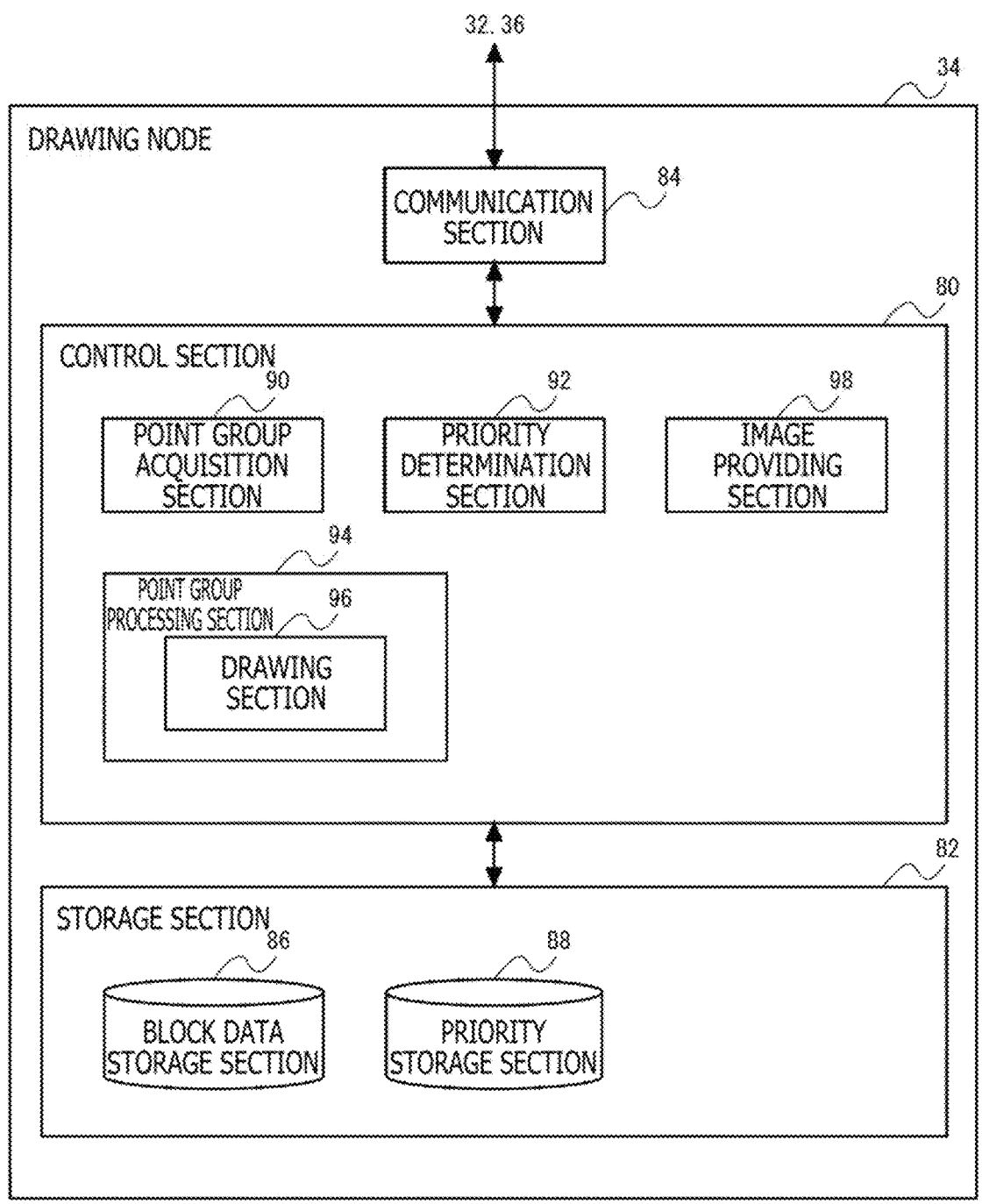
FIG. 10 is a block diagram illustrating a functional configuration of the drawing node according to the variation.

FIG. 10 is a block diagram illustrating a functional configuration of the drawing nodes 34 according to the variation. A control section 80, a storage section 82, and a communication section 84 illustrated in FIG. 10 correspond to the control section 40, the storage section 42, and the communication section 44 illustrated in FIG. 4. Further, a point group acquisition section 90, a priority determination section 92, and a point group processing section 94 illustrated in FIG. 10 correspond to the point group acquisition section 54, the priority determination section 58, and the point group processing section 60 illustrated in FIG. 4.

The point group acquisition section 90 acquires the point data of the plurality of drawing target blocks transmitted from the master node 32. The priority determination section 92 determines the priority of each drawing target block on the basis of the number of points belonging to each of the plurality of drawing target blocks. For example, the priority determination section 92 counts the number of the points belonging to each of the plurality of drawing target blocks. Further, the priority determination section 92 gives a higher priority to the drawing target block with a larger number of included points.

The point group processing section 94 includes a drawing section 96. The drawing section 96 sequentially generates the plurality of individual images on the basis of the point data of the plurality of drawing target blocks transmitted from the master node 32. On this occasion, the drawing section 96 early generates the individual image in the higher priority drawing target blocks. The image providing section 98 transmits data of the individual image generated by the drawing section 96 to the display control node 36.

When the individual image based on a portion of drawing target blocks has not been generated among the plurality of drawing target blocks until the predetermined drawing timing, the drawing section 96 skips generation processing of the individual image on the basis of the portion of drawing target blocks. In other words, while the individual image based on the portion of drawing target block is not generated, the drawing section 96 ends the processing on the drawing target block. In the result, an image based on the lower priority drawing target block may not be generated depending on the load of the drawing processing.

According to the drawing node 34 of the variation, in the block with a smaller number of points among the plurality of blocks into which the photographing space indicated by the point group is divided, the priority of the drawing processing based on the block is made low. Through this process, even when the point group includes a large amount of point data, the load of the drawing processing can be suppressed. Note that the drawing node 34 of the variation may further include the space data storage section 46, the space division section 52, and the visibility determination section 56 functioning as the master node 32 in the embodiment. Further, in the variation, the priority determination section 92 functioning as the drawing node 34 may function as the master node 32. Further, the drawing section 96 of the drawing node 34 may generate the plurality of individual images based on the plurality of blocks in accordance with the priority determined by the master node 32.

A second variation will be described. The master node 32 of the aforementioned embodiment transmits the point data of the drawing target block displayed in the screen area with which each node is associated to each of the plurality of drawing nodes 34. For example, a screen on which the frame image is displayed is divided into four parts, data of the drawing target block relevant to the left upper area is transmitted to the drawing node 34a, data of the drawing target block relevant to the left lower area is transmitted to the drawing node 34b, and data of the drawing target block relevant to the right lower area is transmitted to the drawing node 34c.

Here, eccentricity of the point is present in the photographing space. Therefore, when the screen is always divided with the same mode and a transmission destination of the drawing target block is determined, a load may slant to a specified drawing node. For example, there may be caused a state that a drawing load is considerably more than an allowed value in one drawing node, and by contrast, the drawing load is considerably less than the allowed value in another drawing node. As a result, in drawing node on which the load is concentrated, a delay may be caused in the drawing processing. To solve the above problem, the master node 32 according to the variation further include an adjustment section (not illustrated) that dynamically adjusts a responsible range of each drawing node so that the load of each drawing node is made equal as much as possible. The adjustment section may adjust the responsible range of each drawing node so that a distribution of the load of each drawing node is equal to or less than the predetermined value.

FIG. 11 schematically illustrates a method for equalizing the load of the plurality of drawing nodes. Here, a drawing node 34d (not illustrated) exists as a fourth drawing node in addition to the drawing node 34a, the drawing node 34b, and the drawing node 34c illustrated in FIG. 3. As illustrated in FIG. 11(a), the adjustment section divides a screen that allows the frame image to be displayed into four parts. In a default, the drawing node 34a handles drawing of an area 100, the drawing node 34b handles drawing of an area 102, the drawing node 34c handles drawing of an area 104, and the drawing node 34d handles drawing of an area 106. A number in each area indicates a size of the load of the drawing processing. Specifically, the number in each area is assumed to indicate the number of blocks included in each area. As another mode, the number in each area may indicate a ratio of the number of points included in each area. In an example illustrated in FIG. 11(a), when the screen is simply divided into quarters, the load is concentrated on the drawing node 34a.

A size (e.g., an allowed block number and hereinafter, referred to as an "allowable load") of the load allowed in each drawing node is assumed to be preliminarily determined to be "5." When the load in any area is more than "5," as illustrated in FIG. 11(b), the adjustment section divides a maximized-load area (area in which the relevant block number is maximized) in half along a long side axis of the area. For example, midpoints of long sides may be joined to divide the area in half. In a first division illustrated in FIG. 11(b), the load of one area is still more than "5." Therefore, as illustrated in FIG. 11(c), the adjustment section divides the maximized-load area in half again.

When the load in each area is equal to or less than the allowable load, the adjustment section calculates a difference between the load in each area and the allowable load. FIG. 11(d) illustrates calculation results. As illustrated in FIG. 11(e), the adjustment section integrates an area in which a difference between the load in each area and the allowable load is equal to or more than a predetermined value (here, four) with an adjacent area. FIG. 11(f) illustrates a result in which the areas are integrated. When a distribution of the load in each area is equal to or less than a predetermined value (e.g., "1.6"), the adjustment section ends the adjustment processing. The point group distribution section 62 of the master node 32 transmits, for example, data of the drawing target block relevant to an area 110 to the drawing node 34a and transmits data of the drawing target block relevant to an area 112 to the drawing node 34b. Further, the point group distribution section 62 transmits data of the drawing target block relevant to an area 114 to the drawing node 34c and transmits data of the drawing target block relevant to an area 116 to the drawing node 34d.

A distribution of the areas 100 to 106 illustrated in FIG. 11(a) is equal to "13.5," while a distribution of the areas 110 to 116 illustrated in FIG. 11(f) is reduced to "1.5." As described above, according to the mode of the variation, the load of each drawing node can be equalized. Further, the load can be suppressed from being concentrated on a specified load or the drawing can be suppressed from getting late by the specified node.

As a third variation, a usage example of the image processing system 30 according to the embodiment will be described. An external apparatus (external system) to the image processing system 30 photographs a situation of sports performed in a stadium, etc. and generates data of the point group. The external apparatus transmits the generated data of the point group to the image processing system 30 as a cloud system via the communication network. In the same manner as in the embodiment, the image processing system 30 (here, the master node 32) divides a space indicated by the data of the point group into the plurality of blocks and gives a priority to each block on the basis of the number of the included points. The image processing system 30 transmits the data of the point group to a client apparatus (user apparatus, etc. that displays an image of ongoing sports) and early transmits data of the higher priority blocks on this occasion.

In order to early deliver a block with a larger number of points to the client apparatus, even if a delay is caused in communication, there can be improved the possibility that the block with a larger number of points, in other words, a portion with large information is distributed to the client apparatus until the predetermined timing. Note that the external apparatus that generates the data of the point group may further divide the space into the plurality of blocks and transmit the point data of each block to the image processing system 30. In this case, the image processing system 30 may perform processing subsequent to the prioritization.

As a fourth variation, another usage example of the image processing system 30 according to the embodiment will be described. Here, the client apparatus acquires the data of the point group stored in a server and performs processing (drawing, etc.). The server includes a function of the master node 32 according to the embodiment. The server divides a space indicated by the data of the point group, gives a priority to each block on the basis of the number of the included points, and early transmits data of the higher priority blocks to the client apparatus. Even in the variation, to early deliver the block with a larger number of points to the client apparatus, even if a delay is caused in communication, there can be improved the possibility that the block with a larger number of points, in other words, a portion with large information is processed (drawn, etc.) by the client apparatus.

Techniques described in the embodiment are not limited to a case in which the point group data indicating a situation of the real space is processed (drawn, etc.). Further, the above techniques are applicable to even a case in which the point group data indicating a situation of the virtual space is processed (drawn, etc.) and can implement efficient point group processing in the same manner as in the embodiment.

Any combinations of the embodiments and variations described above are also valid as embodiments of the present invention. A new embodiment resulting from such combinations also has the effects of each of the combined embodiments and variations.

It will be understood by those skilled in the art that the functions to be achieved by each of the constituent features in the claims are implemented by one unit or a linkage thereof of each of the components indicated in the embodiments and variations described above.

REFERENCE SIGNS LIST

30 Image processing system, 32 Master node, 34 Drawing node, 52 Space division section, 54 Point group acquisition section, 58 Priority determination section, 60 Point group processing section, 62 Point group distribution section, 90 Point group acquisition section, 92 Priority determination section, 96 Drawing section.

INDUSTRIAL APPLICABILITY

The present invention is applicable to an apparatus that performs data processing using a point group.

The invention claimed is:

1. A data processing apparatus comprising:
a point group acquisition section configured to acquire a point group, each point of which belongs to any one of a plurality of blocks into which a space has been divided, the point group representing an appearance of the space by a collection of a plurality of points;
a priority determination section configured to determine a priority of each block on a basis of the number of points belonging to each of the plurality of blocks, and: (i) determines a higher priority for a block with a larger number of points, (ii) determines a higher priority for a block with a higher density, defined as a number of points per unit volume of the block, and (iii) determines a higher priority for a block with a higher rate, defined as a number of points within the block divided by a total number of points within the point group; and
a point group processing section configured to process the plurality of blocks in accordance with the priority determined by the priority determination section,
wherein the point group processing section transmits point data in units of the blocks to an external apparatus that ought to perform data processing based on the point group via a communication network, and in doing so, transmits the point data of a higher priority block before lower priority blocks.

2. The data processing apparatus according to claim 1, wherein the priority determination section determines a higher priority of a block with a larger number of points.

3. The data processing apparatus according to claim 1, wherein the point group processing section generates an image of each block on a basis of a point of each block, and in doing so, early generates an image of the higher priority block.

4. The data processing apparatus according to claim 1, wherein the point group processing section early performs the data processing based on a point of the higher priority block and, when a block in which the data processing has not been completed until a predetermined time point exists, skips the data processing based on the point of the block.

5. The data processing apparatus according to claim 1, further comprising: a division section configured to divide the space into the plurality of blocks in accordance with a predetermined algorithm.

6. The data processing apparatus of claim 1, wherein the priority determination section determines the priority of each block on a basis of the number of points belonging to each of the plurality of blocks, and determines a higher priority for a block with a larger number of points.

7. The data processing apparatus of claim 1, wherein the priority determination section determines the priority of each block on a basis of the number of points belonging to each of the plurality of blocks, and determines a higher priority for a block with a higher density, defined as a number of points per unit volume of the block.

8. The data processing apparatus of claim 1, wherein the priority determination section determines the priority of each block on a basis of the number of points belonging to each of the plurality of blocks, and determines a higher priority for a block with a higher rate, defined as a number of points within the block divided by a total number of points within the point group.

9. A data processing method carried out by a computer, comprising:
  using a microprocessor executing a computer program, acquiring a point group, each point of which belongs to any one of a plurality of blocks into which a space has been divided, the point group representing an appearance of the space by a collection of a plurality of points;
  using the microprocessor executing the computer program, determining a priority of each block on a basis of the number of points belonging to each of the plurality of blocks, and: (i) determining a higher priority for a block with a larger number of points, (ii) determining a higher priority for a block with a higher density, defined as a number of points per unit volume of the block, and (iii) determining a higher priority for a block with a higher rate, defined as a number of points within the block divided by a total number of points within the point group; and
  using the microprocessor executing the computer program, processing the plurality of blocks in accordance with the priority determined by the determining,
  wherein the acquiring a point includes transmitting point data in units of the blocks to an external apparatus that ought to perform data processing based on the point group via a communication network, and in doing so, transmits the point data of a higher priority block before lower priority blocks.

10. A non-transitory, computer readable storage medium containing a computer program, which when executed by a computer, causes the computer to carry out actions, comprising:
  acquiring a point group, each point of which belongs to any one of a plurality of blocks into which a space has been divided, the point group representing an appearance of the space by a collection of a plurality of points;
  determining a priority of each block on a basis of the number of points belonging to each of the plurality of blocks, and: (i) determining a higher priority for a block with a larger number of points, (ii) determining a higher priority for a block with a higher density, defined as a number of points per unit volume of the block, and (iii) determining a higher priority for a block with a higher rate, defined as a number of points within the block divided by a total number of points within the point group; and
  processing the plurality of blocks in accordance with the priority determined by the determining,
  wherein the acquiring a point includes transmitting point data in units of the blocks to an external apparatus that ought to perform data processing based on the point group via a communication network, and in doing so, transmits the point data of a higher priority block before lower priority blocks.

* * * * *